Jan. 27, 1959     L. A. JEWELL, JR     2,870,923
CONVERTIBLE DUMP BODY

Filed May 23, 1957     6 Sheets-Sheet 3

Inventor
Lisle A. Jewell Jr.
By Ira Milton Jones
Attorney

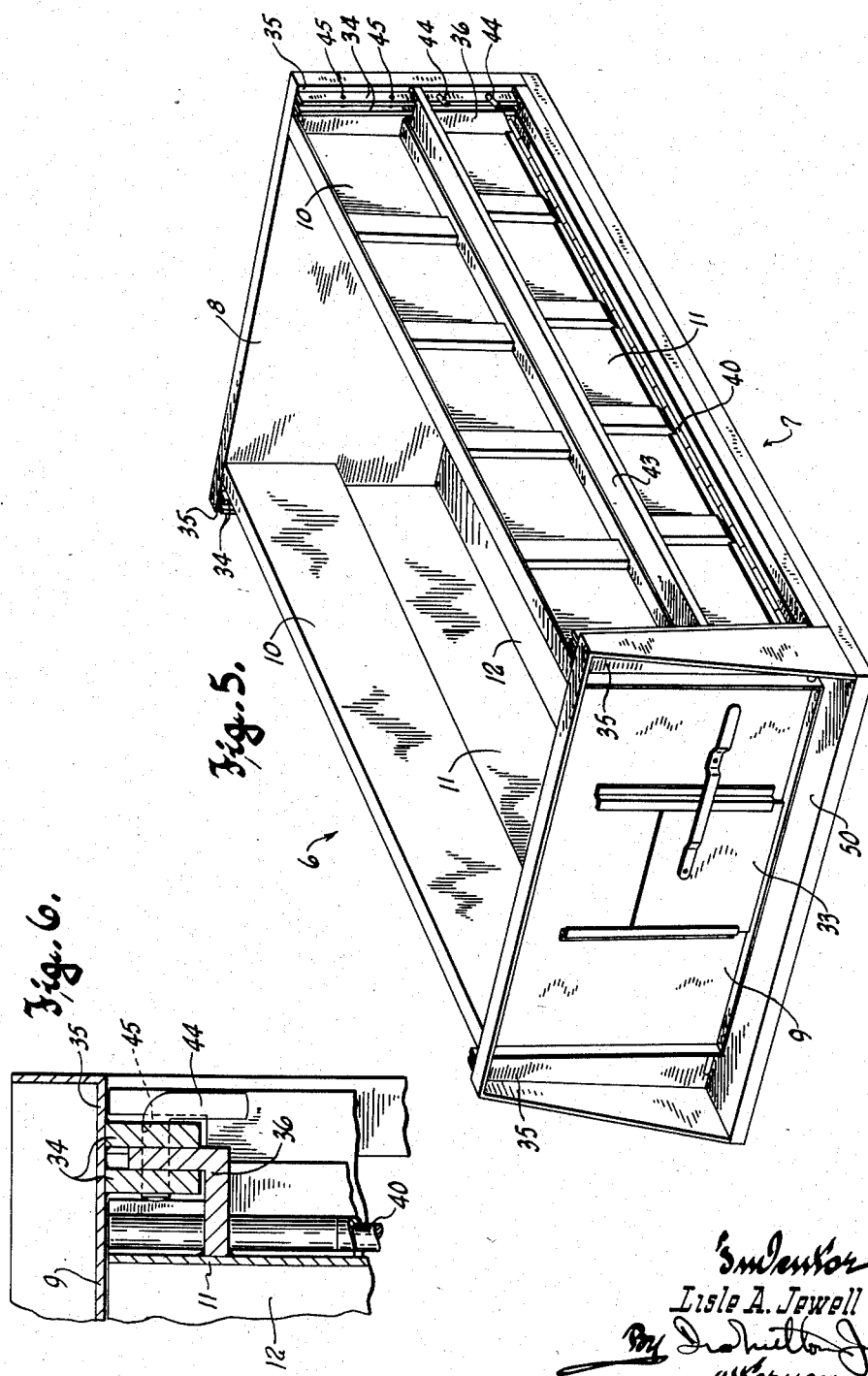

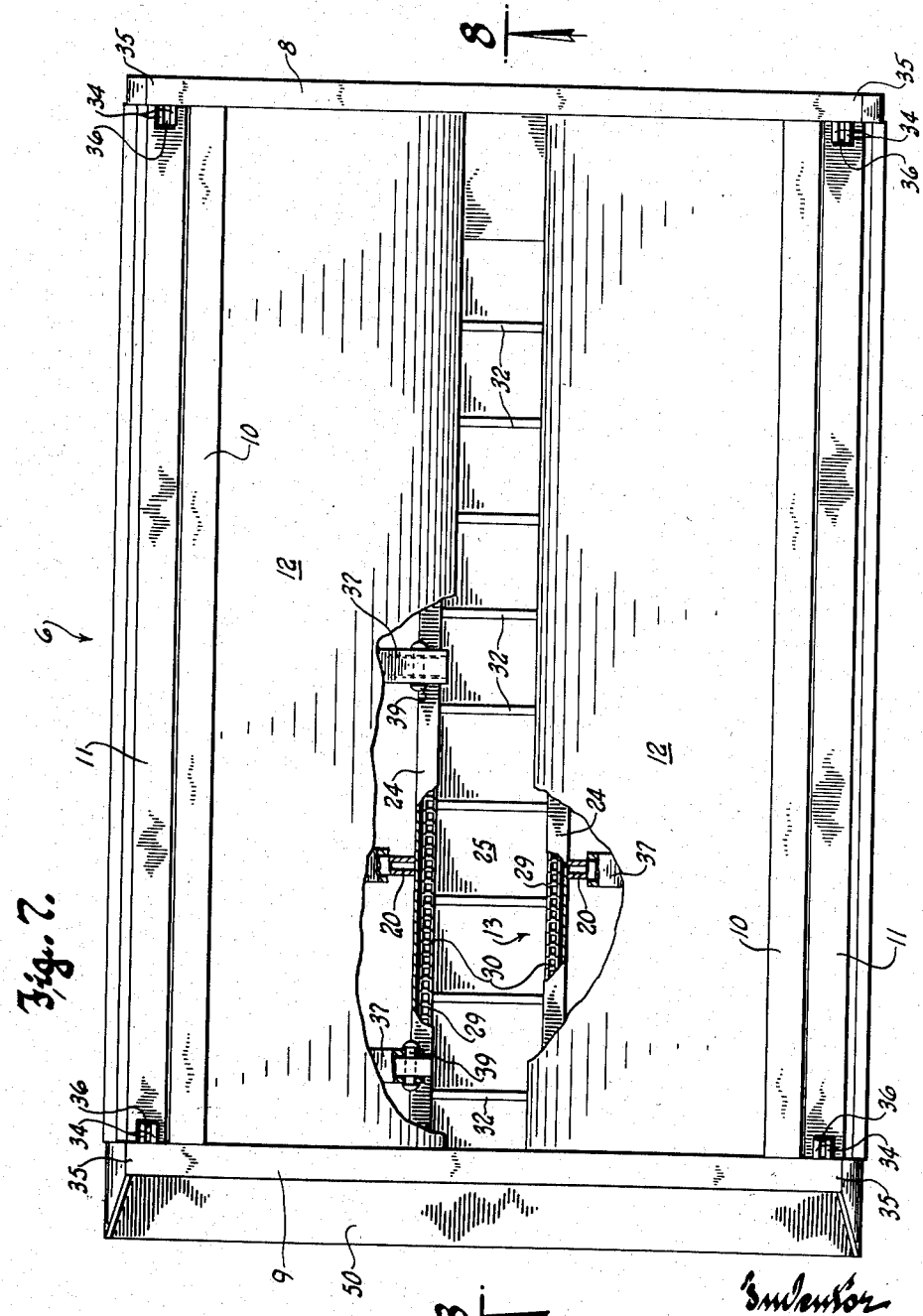

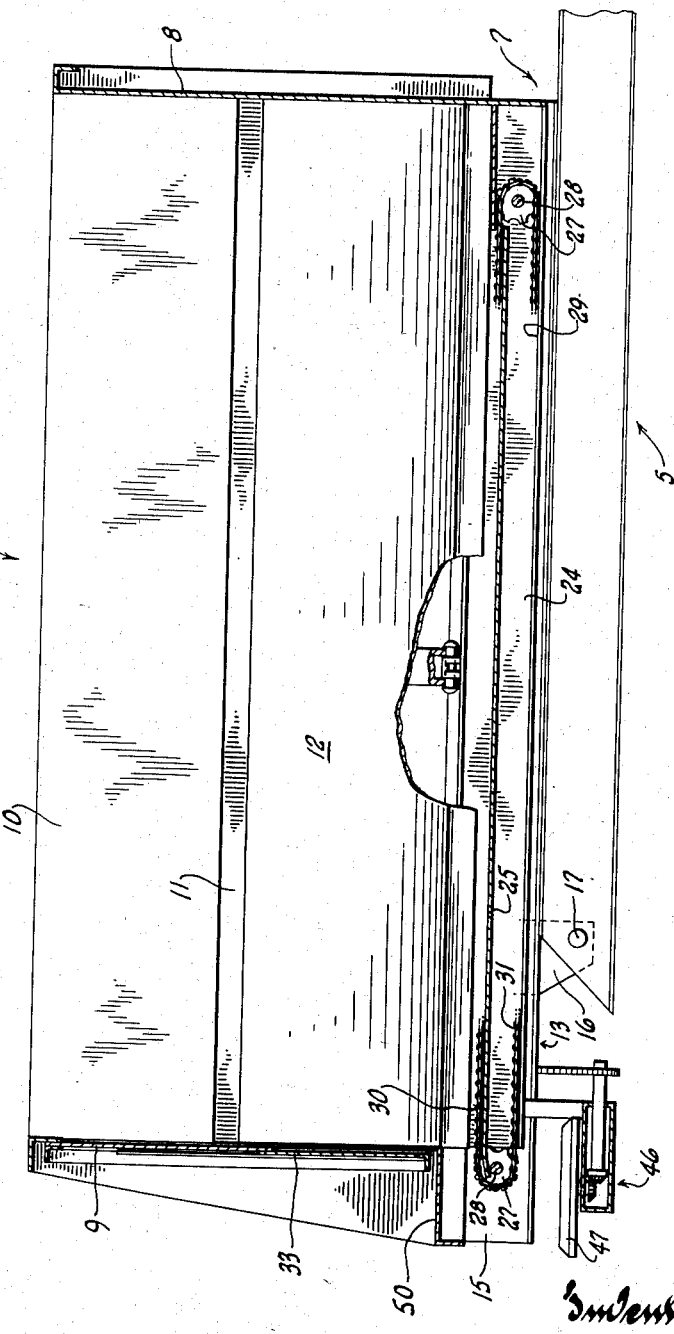

United States Patent Office 2,870,923
Patented Jan. 27, 1959

2,870,923

CONVERTIBLE DUMP BODY

Lisle A. Jewell, Jr., Kinsman, Ohio

Application May 23, 1957, Serial No. 661,245

3 Claims. (Cl. 214—83.36)

This invention relates to bodies for vehicles such as motor trucks and railway cars, and refers more particularly to a vehicle body which may be readily converted to adapt it for use as a dump body or as a spreader for granular material.

In areas where snow and ice accumulate on streets and highways during the winter season, it is customary to spread salt, sand or fine gravel on such slippery surfaces for the safety of automotive traffic. Heretofore a conventional dump truck has been used for this purpose, a supply of the granular material being carried in the truck body to be spread over the pavement by means of an automatic centrifugal spreader or slinger device attached to or towed by the truck. Such a mechanical spreader was not fully automatic because it was necessary, as a rule, to post a workman in the truck body whose duty it was to be sure that granular material would at all times be fed into the spreader mechanism.

It has heretofore been proposed to provide a conveyor extending lengthwise along the floor of a truck body for the purpose of moving granular material rearwardly out of the body at a substantially constant rate, but every prior device of this type had an important disadvantage which made it impractical as a feed for a granular material spreader. Trucks used for spreading sand and the like are employed for this special purpose only at infrequent intervals during a part of the year, and during the remainder of the year they must be utilized for other purposes, usually as dump trucks. A body having a conveyor extending lengthwise therethrough must have downwardly converging side walls which guide the contents of the body onto the conveyor, and if such a body were employed for dump truck use the inclined walls would either appreciably limit the capacity of the body or would dispose its load so high as to raise the center of gravity of the loaded truck to an unsafe position.

It is therefore an object of this invention to provide a body for a motor truck or similar vehicle wherein provision is made for completely automatically spreading granular material over pavement traversed by the vehicle, and which body is also readily adaptable for ordinary dump body operation when the spreader mechanism is not in use.

More specifically, it is an object of the present invention to provide a body for a motor truck or similar vehicle which body incorporates a lengthwise extending conveyor in its bottom and is readily convertible to a spreader adaptation in which the body has a hopper-shaped transverse section by which material in the body is guided onto the conveyor, or to a dump body adaptation wherein the body has a substantially rectangular cross section providing a satisfactorily large carrying capacity without raising the center of gravity to an abnormally high position.

Another object of this invention resides in the provision of a convertible vehicle body of the character described in which body the conversion from dump truck to conveyorized operation, or vice versa, may be very quickly and easily made.

A further object of this invention resides in the provision of a convertible vehicle body of the character described having a centrifugal spreader mounted at its rear in a position where the spreader does not interfere with ordinary dump truck use of the body but is adapted to receive material discharged from the body by a conveyor in the body, to spread such material evenly across a surface traversed by the vehicle.

Still another object of this invention resides in the provision of a convertible vehicle body of the character described which will be sturdy and rugged, will be well balanced in either type of operation for which it is adapted, and will have no tendency to leak fine materials with which it may be loaded.

With the above and other objects in view which will appear as the description proceeds, this invention resides in the novel construction, combination and arrangement of parts substantially as hereinafter described and more particularly defined by the appended claims, it being understood that such changes in the precise embodiment of the hereindisclosed invention may be made as come within the scope of the claims.

The accompanying drawings illustrate one complete example of the physical embodiments of the invention constructed according to the best mode so far devised for the practical application of the principles thereof, and in which:

Figure 5 is a perspective view of the body of this invention, shown in its dump truck conversion;

Figure 6 is a fragmentary sectional view taken on the plane of the line 6—6 in Figure 3;

Figure 7 is a plan view looking down into the body, which is shown in its hopper conversion, with portions broken away to show details; and Figure 8 is a longitudinal sectional view taken substantially on the plane of the line 8—8 in Figure 7.

Figure 1:
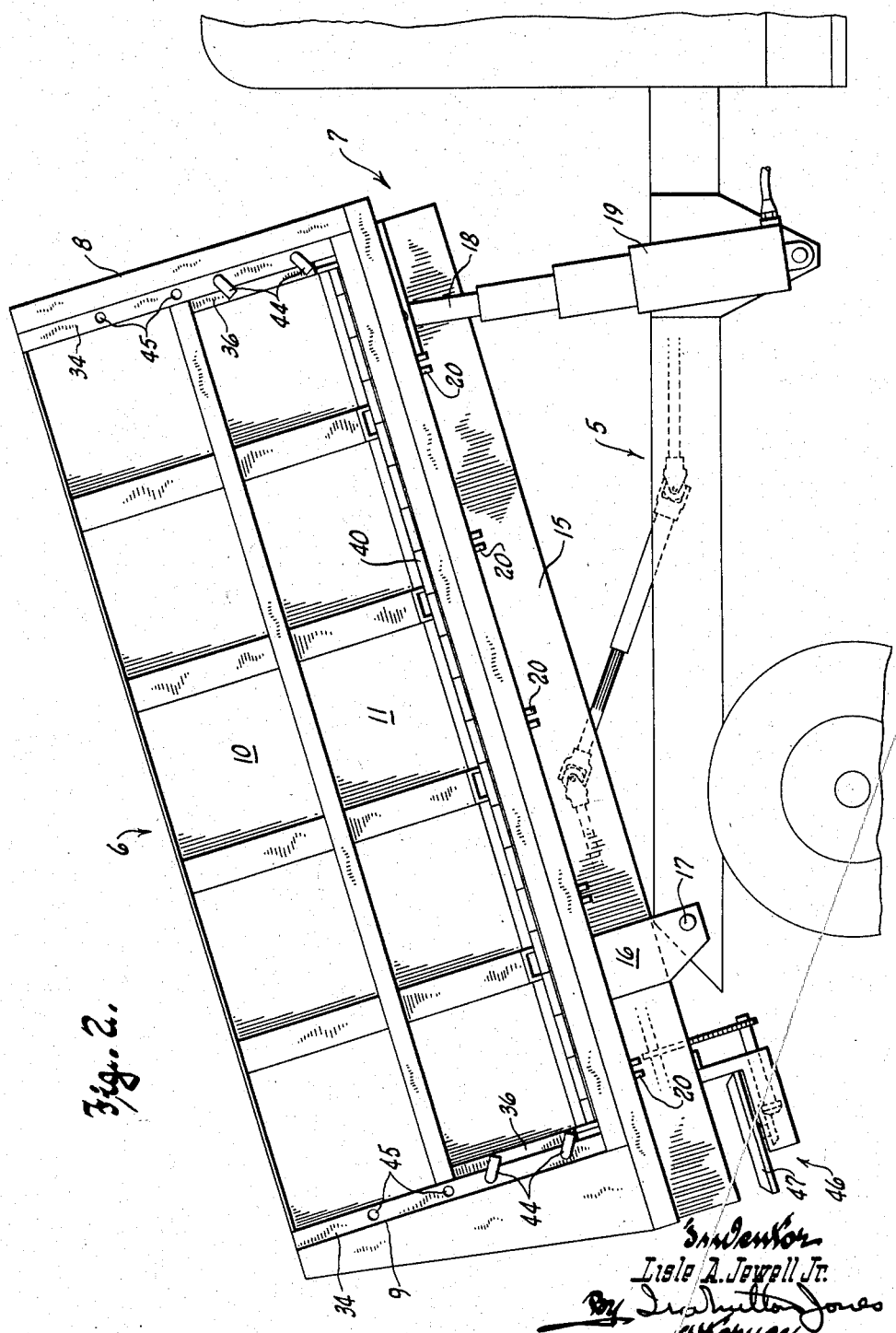
Figure 1 is a side elevational view of a truck having the body of this invention mounted on its chassis, the body being shown adapted for normal dump truck operation.
Figure 2:
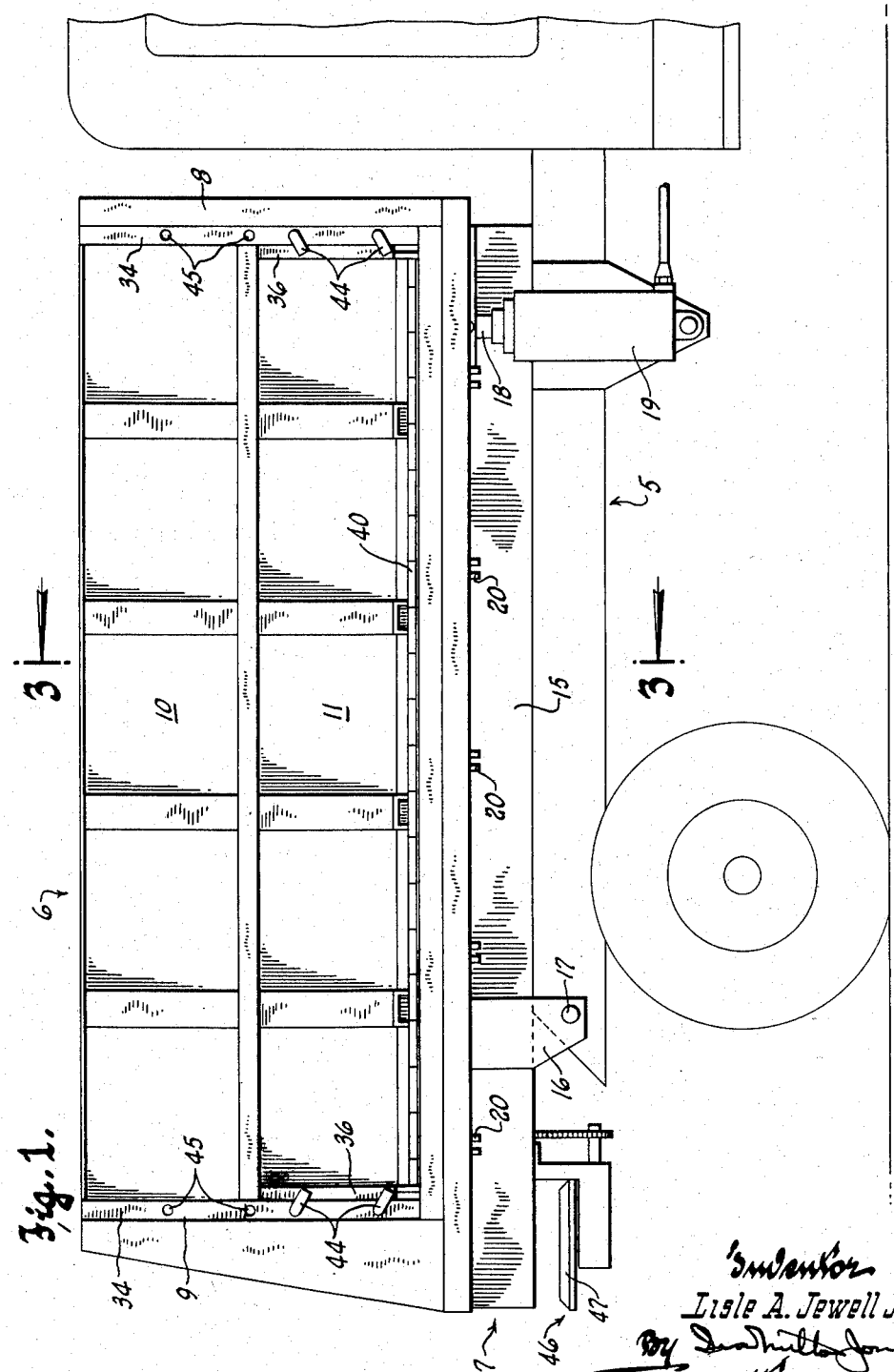
Figure 2 is a view similar to Figure 1 but showing the body partially tilted toward its dumping position.

Referring now to the accompanying drawings, in which like numerals designate like parts throughout the several views, the numeral 5 designates generally the chassis of a motor truck upon which is mounted a convertible body embodying the principles of this invention and which is designated generally by 6.

In general, the body comprises a frame 7 which supports front and rear upright walls 8 and 9, respectively, a pair of fixed side wall members 10, one extending along each side of the body, a pair of movable side wall members 11, and a pair of movable floor members 12. The frame also supports a conveyor 13 which is substantially narrower than the body and along the bottom of the body on its longitudinal center line.

The frame consists of a pair of laterally spaced keel-like longitudinal bearers 15 by which the body is mounted on the chassis of a motor truck or other vehicle. A bracket 16 projecting downwardly from each bearer near the rear thereof receives a trunnion 17 projecting from the chassis frame and by which the body is tiltably mounted on the chassis in a conventional manner. Near its front each bearer is connected with the extensible ram 18 of a hydraulic jack 19 by which tilting of the body may be effected.

A plurality of transverse frame members 20 are fastened across each of the bearers at spaced intervals along the length of the bearer. Each of the members 20 extends from one edge of the conveyor to the adjacent side edge of the body, and the transverse members along each bearer are lengthwise aligned with those on the other bearer.

The inner ends of the members 20 are anchored to channels 24 which extend the full length of the body, with their flanges projecting inwardly toward one another. A horizontally disposed plate 25 extends most of the length of the channels with its side edges secured to their webs to render the body frame rigid and also provide a support for the conveyor.

At each end of the body is mounted a pair of sprockets 27 axially spaced apart on a common shaft 28, and a pair of endless roller chains 29 are trained around the sprockets on the two shafts. (See Figure 8.) The upper stretch 30 of each chain runs on the upper surface of the plate 25, while the lower stretch 31 of each chain runs on the lower flange of the adjacent channel 24. A suitable power transmission of any desired known type rotatably drives one of the sprocket shafts 28 to actuate the conveyor. Cross bars 32, each having its opposite ends connected with the two chains, serve to propel granular material along the top of plate 25 when the conveyor is in use, the direction of rotation of the drive sprocket, of course, being such that the upper stretch of the chain moves rearwardly.

The front and rear walls 8 and 9 are also supported by the frame, and they cooperate in supporting the fixed side wall members 10. The rear wall may be mounted to swing from its top to provide a conventional tail gate, and may also be provided with a medial aperture closed by a sliding hatch 33.

The height of each of the fixed side wall members 10 is preferably about half that of the body, and its lower edge is spaced above the bottom of the body by a distance which is about equal to its own height. In the dump truck adaptation of the body of this invention, this gap between the lower edge of each fixed side wall and the bottom of the body is closed by one of the movable side wall members 11, which is mounted for up and down substantially translatory motion. The tracks by which the movable side wall members are guidingly confined for such motion comprise pairs of parallel flange-like rails 34 on fixed extensions 35 of the front and rear walls, which extensions project beyond the side walls at both sides of the body. These rails extend substantially the full height of the body and are uniformly spaced apart to receive between them one leg of an L-shaped guide member 36 secured to the movable side wall member near its adjacent end.

Each of the movable side wall members is hingedly connected along its lower edge with one of the floor members 12.

Figure 3:
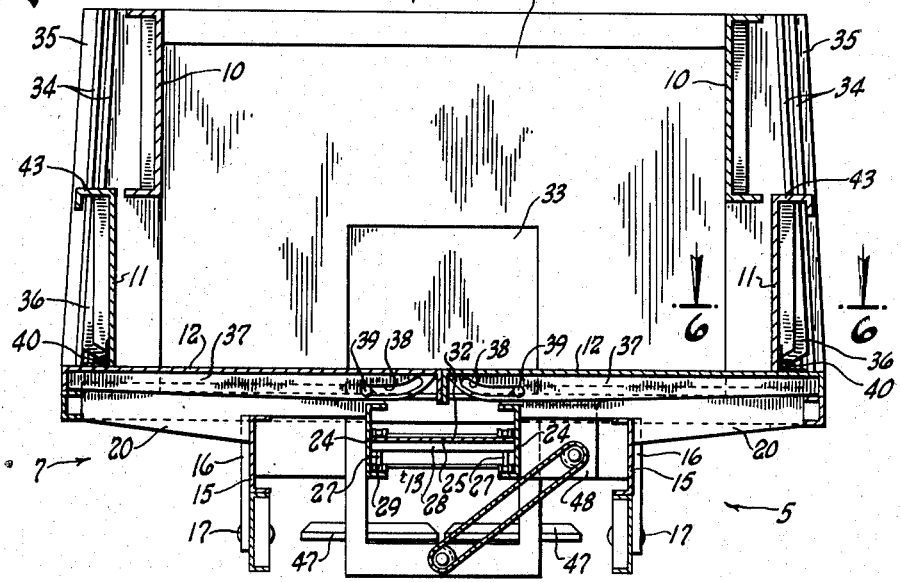
Figure 3 is a sectional view taken on the plane of the line 3—3 in Figure 1.

Each of the floor members has a width substantially equal to half that of the body, and its length is such as to extend from the inner surface of the front wall to that of the rear wall. In the dump truck conversion of the body the two floor members are supported by the cross members 20, coplanar with one another and with their inner edges closely adjacent or engaging one another. Hence in this position the adjacent marginal edge portions of the floor members overlie the conveyor and are spaced above it, as best seen in Figure 3.

Extending laterally across each floor member at the under side thereof are a plurality of channel-like ribs 37, each having its flanges projecting downwardly and straddling one of the fixed cross members 20 when the floor member is in its horizontal position. Near its inner end each of the ribs has an arcuate slot 38 in each of its flanges, and in these slots is engaged a pin 39 fixed in the adjacent cross member 20. By means of these pin and slot connections, each floor member is mounted for swinging motion by which its outer edge may be raised and lowered with the adjacent movable wall member 11, and for outward sliding motion whereby its inner edge is carried away from that of the other floor member a distance sufficient to expose the conveyor.

The hinge connection between each movable side wall member and its adjacent floor member may comprise a hinge 40 extending the full length of said members, or any other desired connection which will permit relative swinging motion between those members and will also provide reasonable assurance that granular material will not leak out between them.

Figure 4:
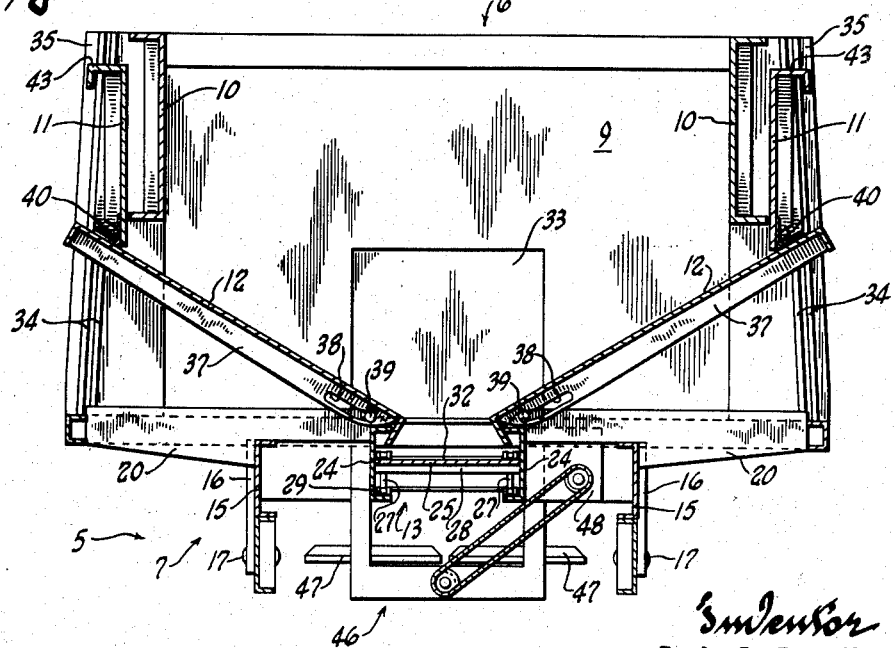
Figure 4 is a view similar to Figure 3 but showing the body in its hopper adaptation in which the conveyor is used.

It will be seen that when the movable side wall members are raised to their upper positions, in which they flatwise overlie the outer surfaces of the fixed side wall members, the two floor members are thereby swung upwardly and moved outwardly to dispose them in convergent relationship to the conveyor, as best seen in Figure 4, and the floor members then cooperate with one another to define a hopper by which the contents of the body are funneled toward the conveyor. The movable side walls may be raised to this position by any desired means, as for example by using a portable jack. To maintain the movable side wall member in either of its two positions, readily removable pins 44 are engageable in holes 45 in the rails 34 which align with holes in the guide member 36 in either position of the movable side wall member.

A centrifugal spreader 46 is mounted beneath the body, at the rear thereof, in a position to have granular material from the conveyor dropped onto its rotors 47. The spreader may be of conventional type, and may be driven by a suitable transmission 48 which is drivingly connected with the power takeoff on the truck chassis. This spreader does not interfere with dumping operation of the body because the provision of a fixed shelf-like projection 50 at the rear of the body, coplanar with the floor members when the latter are in their horizontal position. This projection extends rearwardly to a point substantially in vertical alignment wtih the rear of the spreader, and therefore when the body is tilted to dump its contents the projection in effect carries the contents over the conveyor. However, because the shelf-like projection is spaced a substantial distance above the conveyor, it does not interfere with use of the latter.

From the foregoing description taken together with the accompanying drawings it will be apparent that this invention provides a convertible body for motor trucks or the like which is readily adaptable for fully automatic spreading of granular material or for dump body use, wherein a centrifugal type of spreader and a conveyor by which the spreader is fed may be incorporated in the body as permanent components thereof and do not interfere with its usual dumping use.

What is claimed as my invention is:

1. In a vehicle body having a frame and spaced apart upright front, rear and side walls supported by the frame: a pair of fixed side wall members supported by the frame in upright positions along opposite sides of the body and each having its lower edge spaced a substantial distance above the bottom of the body; a pair of movable side wall members; means on the frame mounting one of said movable side wall members upright along each side of the body for up and down motion between a lower position in which the movable member spans the gap between the lower edge of the adjacent fixed side wall member and the bottom of the body and an upper position in which the movable side wall member flatwise overlies the outer surface of the fixed side wall member; a conveyor supported by the frame and extending lengthwise along the bottom of the body with its longitudinal side edges spaced from the side walls; means providing a flat substantially horizontal bottom for the body, comprising a pair of movable complementary floor members, each lying flatwise upon the frame and providing one longitudinal half of said bottom; means hingedly connecting the outer longitudinal edges of the floor members with the lower edges of the adjacent movable side wall members for movement therewith between a dump body position in which the movable side wall members are in their lower positions and the floor members are disposed substantially horizontally upon the frame and overlie the conveyor, and a hopper position in which the movable side wall members are in their upper positions and the floor members are held thereby in sloping positions inclined inwardly and downwardly toward the conveyor with their inner edges spaced apart and near the sides of the conveyor to expose the same; cooperating guide means on the frame adjacent to the opposite sides of the conveyor, and on inner longitudinal edge portions of the floor members to support said inner edge portions of the floor members at substantially the same level adjacent to the top of the frame in any position of the floor members; and means for readily releasably holding each of the movable side wall members in either its upper or its lower position.

2. In a vehicle body having a frame, spaced apart upright front and rear walls supported by the frame, and a conveyor supported by the frame and extending lengthwise along the bottom of the body, said conveyor being substantially narrower than the body and being disposed intermediate the sides of the body: a pair of movable side wall members; means on the frame movably mounting one of said side wall members upright along each side of the body, for up and down substantially translatory motion of the side wall member between a lower position in which its lower edge is disposed adjacent to the plane of the conveyor and an upper position in which its lower edge is spaced a substantial distance above said plane; means providing a flat substantially horizontal bottom for the body, comprising a pair of movable complementary floor members, each lying flatwise upon the frame and providing one longitudinal half of said bottom; means hingedly connecting the outer longitudinal edge of each of the floor members with the lower edge of the adjacent movable side wall member for movement therewith between a dump body position in which the movable side wall member is in its lower position and the floor member is disposed substantially horizontally upon the frame and in part overlies the conveyor with its inner edge adjacent to that of the other floor member, and a hopper position in which the movable side wall member is in its upper position and the floor member is held thereby inclined inwardly downwardly toward the conveyor and has its inner edge spaced from that of the other floor member to expose the conveyor; cooperating guide means on the frame and on inner longitudinal edge portions of each floor member to support said inner edge portions of the floor member at a level adjacent to the top of the frame in both of said positions of the floor member; and means for readily releasably holding each of the movable side wall members in either its upper or its lower position.

3. In a vehicle body having a frame, spaced apart upright front and rear walls supported by the frame, and a conveyor narrower than the body supported by the frame and extending lengthwise along the bottom of the body: a pair of floor members, each having a length to extend from the front wall to the rear wall of the body, and said floor members having a combined width equal to that of the body when they are disposed in horizontal laterally adjacent coplanar positions resting flatwise upon the frame; a plurality of laterally extending stiffeners on the underside of each of said floor members; cooperating means on the frame of the vehicle and on the stiffeners providing a sliding pivotal connection between each of the floor members and the frame by which the floor members are mounted for lateral in and out movement and for swinging up and down movement about longitudinal axes adjacent to their inner edges, to enable the floor members to be moved from a coplanar dump body position in which their inner marginal edge portions are contiguous and overlie the conveyor, to a hopper defining position in which the adjacent edges of the floor members are spaced apart to expose the conveyor and the floor members are inclined inwardly downwardly toward the conveyor; a pair of side wall members; means on the frame mounting one of said side wall members at each side of the body in an upright attitude and guiding the same for up and down substantially translatory motion; means hingedly connecting the lower edge of each side wall member with the outer edge of the adjacent floor member so that the floor members are constrained to sliding pivotal motion with up and down movement of the side wall members; and means on the frame for releasably retaining each of the floor members in its hopper defining position.

References Cited in the file of this patent
UNITED STATES PATENTS

| | | |
|---|---|---|
| 1,140,240 | Barth | May 18, 1915 |
| 1,369,299 | Peterson | Feb. 22, 1921 |
| 1,508,210 | Bangert | Sept. 9, 1924 |
| 1,928,859 | Kutscha | Oct. 3, 1933 |
| 2,267,526 | Kutscha | Dec. 23, 1941 |
| 2,517,151 | Weston | Aug. 1, 1950 |